Jan. 6, 1953            E. L. MAGER            2,624,857
ELECTROLUMINESCENT LAMP
Filed Oct. 8, 1949
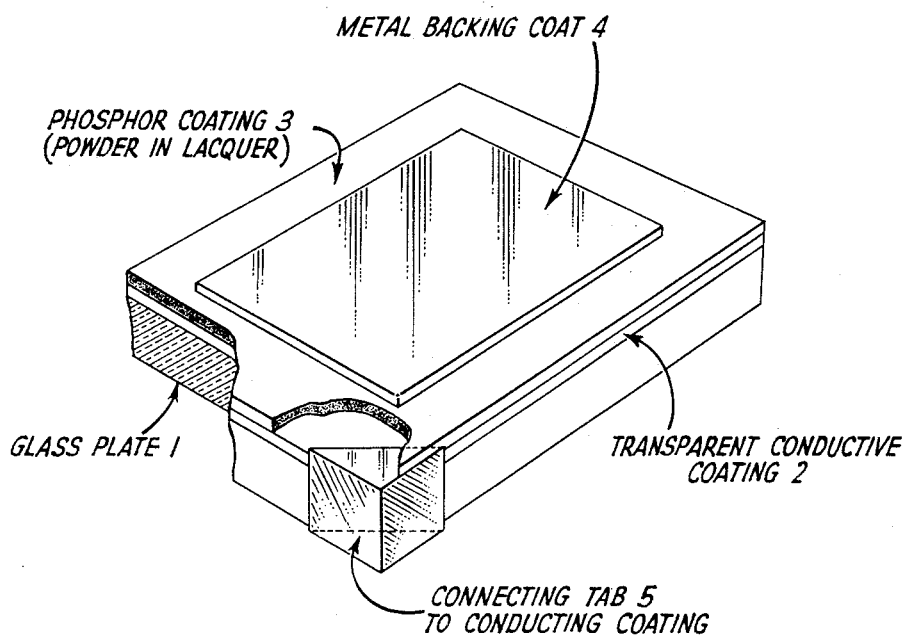
INVENTOR:
ERIC L. MAGER
BY Laurence Burns,
ATTORNEY.

Patented Jan. 6, 1953

2,624,857

UNITED STATES PATENT OFFICE 2,624,857

ELECTROLUMINESCENT LAMP

Eric L. Mager, Peabody, Mass., assignor to Sylvania Electric Products, Inc., Salem, Mass., a corporation of Massachusetts Application October 8, 1949, Serial No. 120,398

5 Claims. (Cl. 313—108)

1

This invention relates to electroluminescent lamps and methods of making them.

In an electroluminescent lamp light is obtained by the direct application of voltage across a phosphor or by placing the phosphor in an electric field. It differs from the usual fluorescent lamp in which the voltage or field is placed across a gas and the radiation from the gas used to excite a phosphor. In the electroluminescent lamp the light appears to be produced only when the voltage is applied and when it is removed, or when the voltage is changed. Such lamps are accordingdy most effective when used on alternating, pulsating or otherwise varying currents.

The lamp of my invention may comprise a phosphor placed between two conductors across which a voltage may be applied, and in the present invention the phosphor is embedded in an insulating dielectric material. The embedded phosphor layer may be compressed between a light-transmitting conducting material such as so-called conducting glass, and a metallic backing layer preferably of good reflectivity, although a transparent conductive backing layer may be used if desired.

Such a device is adaptable to mass production methods and the final unit is easily handled and simply connected to the usual 110-volt lighting line, for example, although higher voltages are often preferable.

Additional features, objects and advantages of the invention will be apparent from the following description, taken with the accompanying figure, which shows a perspective view, partly cut away, of a device according to the invention.

In the figure, the glass plate 1 has the transparent conductive coating 2 on one side thereof. Such coatings are known in the art, and may be applied, for example, by exposing the heated glass to vapors of silicon, tin or titanium chlorides, and afterwards placed in a slightly reducing atmosphere. In some cases, stannic chloride may be mixed with absolute alcohol and glacial acetic acid and the glass plate to be coated dipped into it, if the application by vapors is not convenient.

Whether applied by vapor, dipping or otherwise, the resulting coating appears to contain stannic (or silicic or titanic) oxide, probably to some extent at least reduced to a form lower than the dioxide, although the exact composition is not fully known.

A phosphor coating 3 is placed over the conductive coating 2. The phosphor may be any material which will fluoresce or phosphoresce under the influence of an electric field, for example a fired mixture of zinc sulphide and oxide, activated by halogen and copper and lead, or a phosphor such as described in the copending application of Elmer C. Payne, Serial No. 105,803, filed July 20, 1949.

The phosphor is generally mixed, in finely-powdered form, with a material of high resistivity and high dielectric constant. This prevents flash over in what would otherwise be the spaces between the phosphor particles, and has other advantages as well. The dielectric medium may be a capacitor oil, for example. If the phosphor-in-oil suspension contains enough phosphor to cause an apparent thickening of the mixture, or if the suspension is pressed out quite thinly between the two conducting plates 2 and 4, oil leakage may be absent or negligible.

If, however, oil leakage should be troublesome, the exposed edges of the phosphor-in-oil layer 3 may be sealed with a heat-sealing plastic or a sealing material applied by brush, dip, spray, squeegee or the like. The sealing material should have good oil resistance, high electrical resistivity, good dielectric strength and good adhesion. For example, cellulose acetate, polyvinylidene chloride, polyvinyl butyral, cellulose nitrate, or methyl methacrylate polymer may be used. Polyvinyl butyral, for example may be applied as a shim between the edges of the two conducting plates and sealed in the usual manner with heat and pressure.

I prefer, however, to make the final device a completely dry one, and instead of a liquid such as capacitor oil, to embed the phosphor particles in a solid or semi-solid dielectric material of reasonable light-transmitting properties, such as a suitable solidified oil, wax, resin, plastic or similar material, preferably of good dielectric strength, low power loss, and high dielectric constant. Nicrocellulose plasticized with castor oil, camphor, dioctyl phthalate or the like has proven very effective.

The phosphor may be suspended in a solid dielectric sheet of relatively uniform thickness, for example by methods well known in the art for incorporating pigments into transparent or translucent plastics and forming sheets of such materials. Such a sheet is sandwiched in between the conductive coating 2 and the metal sheet 4, and air is eliminated by squeezing the plates 2 and 4 together, with or without the usual vacuum techniques for the elimination of air. This solid dielectric eliminates the need for any edge seal to retain oil, which is not present in liquid form in this construction.

With an oil dielectric, the metal backing plate 4 should preferably be a smooth, rigid metal plate, for example a piece of stainless steel, but with the solid or semi-solid dielectric, the metal plate 4 may be of foil or other flexible metal sheeting, or may be a metal layer deposited on the film by deposition in a vacuum, or applied by spraying, painting or the like. This permits the lamp to be a simple unit, and facilitates the making of lamps in shapes other than flat.

In one embodiment of my invention, I applied the phosphor-dielectric coating 3 by first mixing 2 grams of quarter-second nitrocellulose, 6 grams of castor oil, 10 grams of the zinc oxide-sulphide phosphor previously mentioned, activated by halogen, copper and lead as activators and finely-powdered, the nitrocellulose, castor oil and phosphor components being mixed into enough butyl acetate and anhydrous ethyl alcohol in equal proportions to give a total volume of about 100 cubic centimeters. The resulting suspension was sprayed onto the conducting coating 2 of glass plate 1 and allowed to dry before adding the metal backing layer 4. The metal backing layer was aluminum, and in this case was applied by evaporation from a tungsten filament onto the phosphor-dielectric layer in a vacuum.

The thicknesses of the various layers may be altered to suit various voltage conditions and the like, but I have found a conducting coating 2 may have a thickness of about a wavelength of light, producing an iridescent effect when viewed at an angle, and a phosphor layer 3 of about 2 one-thousandths of an inch, and a metal layer 4 of a fraction of a thousandth of an inch, to be satisfactory. The plate 1 may have any convenient thickness, and although I have mentioned it as being of glass, it may be of other transparent material, such as plastic, if desired, provided of course that the material is conducting, or can carry a conductive coating 2.

In operation, a voltage, preferably alternating, is applied between the metal tab 5 (connected to conducting coating 2), and the metal layer 4.

The voltage necessarily will depend on the phosphor used, the thickness of the phosphor layer 3, and the brightness desired, but voltages between 25 volts and 2500 volts and even higher have been used. Lamps, according to my invention operating directly from the usual 110 volt line, with no transformers or auxiliary equipment necessary, have been made.

The plate 1 may, of course, be translucent instead of transparent, if desired.

What I claim is:

1. An electroluminescent lamp comprising an electrically-conducting glass piece, a layer thereon of a field-responsive phosphor embedded in a solid dielectric material, and a backing layer of metal thereover.

2. An electroluminescent lamp comprising an electrically-conducting glass piece, a layer thereon of a field-responsive phosphor embedded in a solid dielectric material, the thickness of said layer being of the order of a few thousandths of an inch, and a backing layer of metal thereover.

3. An electroluminescent lamp comprising an electrically conductive glass piece, a layer thereon of a field-responsive phosphor embedded in nitrocellulose, and a backing layer of metal on at least part of said last-mentioned layer.

4. The combination of claim 2, in which the metal backing layer is of aluminum.

5. An electroluminescent lamp comprising an electrically-conducting glass piece, a coating thereon of a field responsive phosphor embedded in a solid dielectric material, and a backing layer of metal thereover.

ERIC L. MAGER.

REFERENCES CITED

The following references are of record in the file of this patent:

UNITED STATES PATENTS

| Number | Name | Date |
|--------|------|------|
| 2,225,044 | George | Dec. 17, 1940 |
| 2,239,887 | Ferrant | Apr. 29, 1941 |
| 2,248,630 | Johnson et al. | July 8, 1941 |

OTHER REFERENCES

The New Phenomenon of Electrophotoluminescence, by G. Destriau, The Philosophical Magazine, vol 38, October 1947, pgs. 700–739.